United States Patent
Klaedtke

(10) Patent No.: US 11,429,542 B2
(45) Date of Patent: Aug. 30, 2022

(54) SECURE DATA STREAM PROCESSING USING TRUSTED EXECUTION ENVIRONMENTS

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 147 days.

(21) Appl. No.: 17/088,614

(22) Filed: Nov. 4, 2020

(65) Prior Publication Data
US 2022/0138115 A1     May 5, 2022

(51) Int. Cl.
| | |
|---|---|
| G06F 12/00 | (2006.01) |
| G06F 13/00 | (2006.01) |
| G06F 13/28 | (2006.01) |
| G06F 12/14 | (2006.01) |
| G06F 21/79 | (2013.01) |
| G06F 9/38 | (2018.01) |
| G06F 9/30 | (2018.01) |
| G06F 21/60 | (2013.01) |

(52) U.S. Cl.
CPC ........ *G06F 12/1425* (2013.01); *G06F 9/3009* (2013.01); *G06F 9/3867* (2013.01); *G06F 12/1408* (2013.01); *G06F 21/602* (2013.01); *G06F 21/79* (2013.01); *G06F 2221/0751* (2013.01)

(58) Field of Classification Search
CPC .............. G06F 12/1425; G06F 12/1408; G06F 21/602; G06F 21/79; G06F 2221/0751
USPC ......................................................... 711/163
See application file for complete search history.

(56) References Cited

U.S. PATENT DOCUMENTS

| | | | |
|---|---|---|---|
| 2008/0250251 A1* | 10/2008 | Lin ........................ | G06F 21/10 713/189 |
| 2015/0207805 A1* | 7/2015 | Blair ..................... | H04L 9/3247 713/176 |
| 2019/0384689 A1 | 12/2019 | Klaedtke | |

(Continued)

OTHER PUBLICATIONS

Xing, Bin et al. "Intel Software Guard Extensions (Intel SGX) Software Support for Dynamic Memory Allocation inside an Enclave," ACM, HASP'16, Jun. 18, 2016.

(Continued)

*Primary Examiner* — Edward J Dudek, Jr.
*Assistant Examiner* — Sidney Li
(74) *Attorney, Agent, or Firm* — Leydig, Voit & Mayer, Ltd.

(57) ABSTRACT

A method for securing data stream processing includes implementing a stage of a data processing pipeline in a trusted execution environment. A state of the stage is represented by a graph-based data structure. Protected memory of the trusted execution environment is reserved for computations of the stage. A key-value store is maintained in the protected memory. The key-value store includes hashes of graph segments of the graph-based data structure for the computations and memory locations of the graph segments. A state part of the computations is moved from the protected memory to unprotected memory. The state part of the computations is loaded back to the protected memory. An integrity of a computation using the state part of the computations is checked using the hashes in the key-value store.

15 Claims, 5 Drawing Sheets

(56) References Cited

U.S. PATENT DOCUMENTS

2022/0027992 A1\* 1/2022 Blevins .............. G06Q 20/3827
2022/0035794 A1\* 2/2022 Mahadik ............. G06F 16/2379

OTHER PUBLICATIONS

Costan, Victor and Srinivas Devadas, "Intel SGX Explained," Cryptology ePrint Archive, Report 2016/086, Jan. 2016.
Basin, David et al. "Runtime Verification over Out-of-order Streams," ACM Transactions on Computational Logic, 21(1), Oct. 2019.
Scarlata, Vinnie et al. "Supporting Third Party Attestation for Intel SGX with Intel Data Center Attestation Primitives," Intel Corporation, Dec. 2018.

\* cited by examiner

US 11,429,542 B2

SECURE DATA STREAM PROCESSING USING TRUSTED EXECUTION ENVIRONMENTS

FIELD

The present invention relates to a method, system and computer-readable medium for secure processing of data streams.

BACKGROUND

There exist a number of different types of data producers which produce data streams that require processing and analysis, typically in real-time or near real-time, in order to implement decisions and actions in a number of technical application areas. Such data streams are often machine generated, e.g., by the devices and components of information technology (IT) systems. For instance, the Internet of Things (IoT) continuously generates, collects and processes data streams which contain data stream elements consisting of time-stamped events. In particular, IoT devices, such as sensors, generate or sense data and IoT platform services collect and analyze this data. Likewise, vehicles, mobile devices such as smartphones or applications running on different devices generate streams of data which require processing for various technical applications.

SUMMARY

In an embodiment, the present invention provides a method for securing data stream processing. The method includes implementing a stage of a data processing pipeline in a trusted execution environment. A state of the stage is represented by a graph-based data structure. Protected memory of the trusted execution environment is reserved for computations of the stage. A key-value store is maintained in the protected memory. The key-value store includes hashes of graph segments of the graph-based data structure for the computations and memory locations of the graph segments. A state part of the computations is moved from the protected memory to unprotected memory. The state part of the computations is loaded back to the protected memory. An integrity of a computation using the state part of the computations is checked using the hashes in the key-value store.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
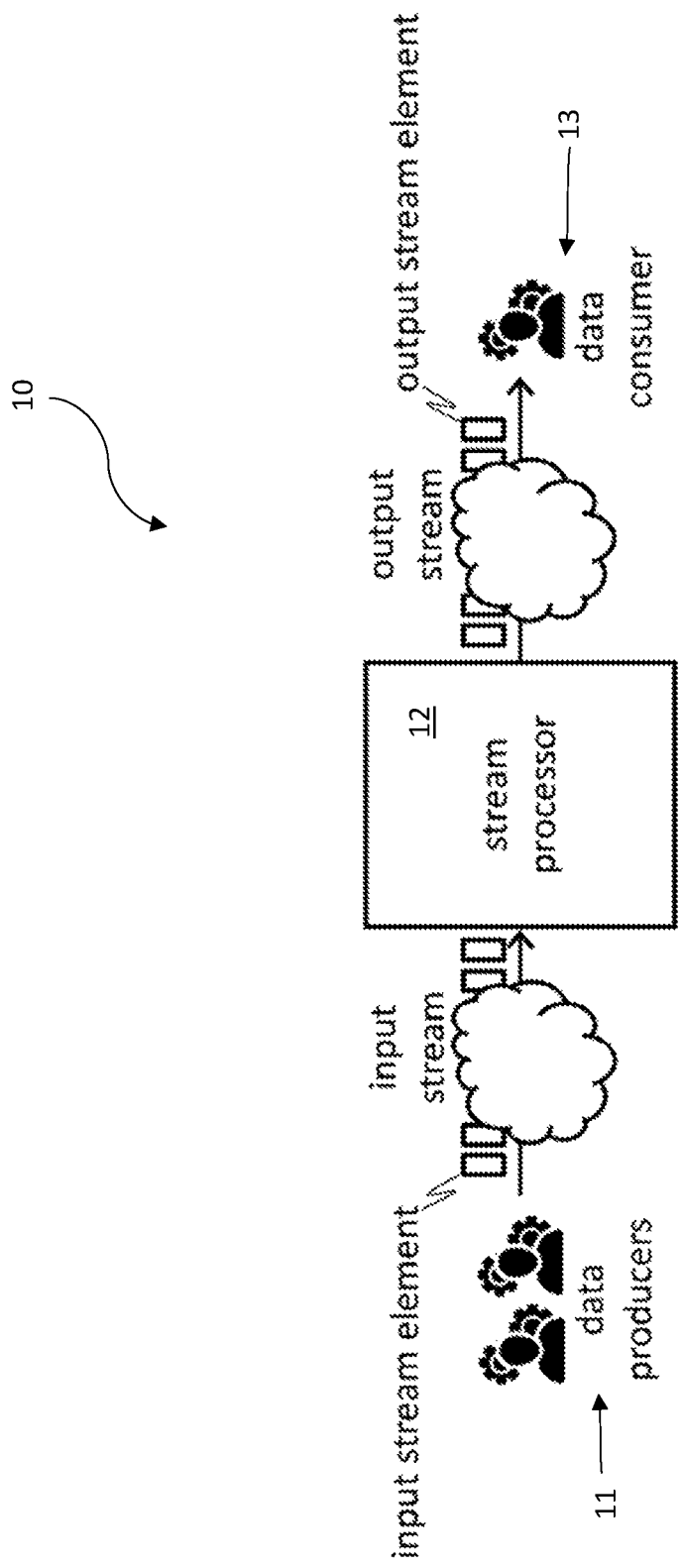
FIG. 1 schematically shows a system for processing data streams.

Due to the size of the data streams which are generated in a number of technical application areas, and complexities in processing data streams, a correspondingly large amount of computational resources is required to process the data streams. An even greater amount of computational resources are required when the analysis is stateful (i.e., the outcome of processing a stream element depends on previously processed data stream elements). In addition to time demands on data stream processing, it should also be ensured that the entity or entities performing the data stream processing are not able to maliciously alter the analysis or the outcome of the analysis.

Embodiments of the present invention provide a method, system and computer-readable medium for processing of data streams in a secure manner and with fewer trust assumptions. Also, embodiments of the present invention provide to reduce the required amount of computational resources for performing the stream processing, thereby increasing computational processing power and/or computation speed, and/or conserving computational resources.

In an embodiment of the present invention, a method is provided which utilizes trusted execution environments to secure the computations in processing data streams. The method addresses the technical problem that protected memory with fast access is a scarce resource in trusted execution environments by allowing to reduce and control the use of the protected memory, e.g., in stateful computations, by temporarily and securely storing parts of a computation's state in unprotected memory. The computational cost overhead in using unprotected memory can also be minimized in accordance with embodiments of the present invention by using pointers and identifiers.

In embodiments of the present invention, a segment or state part is stored in unprotected memory if there is not enough space in the protected memory of a trusted execution environment having code loaded therein for running a stage of a data processing pipeline. Preferably, a segment or state part is never stored in both protected and unprotected memory. From the memory address alone, it can be already inferred whether the memory address is in protected or unprotected memory. For example, the protected memory is within a certain range. Alternatively, flags can be added to the memory address of the key-value pair that indicates whether the memory address is in protected or unprotected memory. When a segment or state part is moved from protected memory to unprotected memory, the corresponding memory space in protected memory can be filled with another segment or state part. Preferably, moving a segment to unprotected memory happens when the part of a graph with the segment is currently not updated. However, another part of the graph is updated, for which some of its segments are currently stored in unprotected memory.

In an embodiment, the present invention provides a method for securing data stream processing. The method includes implementing a stage of a data processing pipeline in a trusted execution environment. A state of the stage is represented by a graph-based data structure. Protected memory of the trusted execution environment is reserved for computations of the stage. A key-value store is maintained in the protected memory. The key-value store includes hashes of graph segments of the graph-based data structure for the computations and memory locations of the graph segments. A state part of the computations is moved from the protected memory to unprotected memory. The state part of the computations is loaded back to the protected memory. An integrity of a computation using the state part of the computations is checked using the hashes in the key-value store.

In an embodiment, the graph-based data structure includes vertices with incoming and outgoing edges assigned to time intervals, each of the graph segments include the vertices which are at a same time interval, and the edges are used as pointers for accessing objects.

In an embodiment, each of the objects includes an identifier, each of the pointers from a source vertex to a target vertex carries an identifier for one of the objects, and it is checked whether the identifiers are equal for accessing the objects.

In an embodiment, in a case that the identifiers are the same, a correct one of the objects is accessed, and, in a case that the identifiers are not the same, the correct one of the objects is determined using the identifier carried by the pointer and the key-value store.

In an embodiment, in a case that the correct one of the objects is stored in the unprotected memory, the object is loaded back into the protected memory using the hashes of the key-value store to ensure computation integrity and the location of the object is updated in the key-value store.

In an embodiment, the time intervals are disjoint, and the identifiers of the objects are based on respective time intervals of the graph segments which contain the objects.

In an embodiment, a counter is used for the identifiers of the objects with the counter being increased each time a new object is added.

In an embodiment, it is determined that the state part of the computations has been tampered with based on a hash of the state part loaded back into the protected memory not matching a hash of the state part stored in the key-value store.

In an embodiment, the hashes of the graph segments are determined using a cryptographic and collision-resistant hash function.

In an embodiment, the data processing pipeline processes an out-of-order stream of time-stamped system events, and the stage is a monitor stage which processes the events and computes verdicts.

In an embodiment, the key-value store is in a form of a hash map or a balanced search tree.

In an embodiment, at least two stages of the data processing pipeline are implemented in the trusted execution environment, and communication between the at least two stages is performed using the protected memory.

In an embodiment, the stage of the data processing pipeline runs concurrently with other stages of the data processing pipeline in separate threads or on separate machines.

In another embodiment, the present invention provides a system for securing data stream processing comprising one or more processors which, alone or in combination, are configured to provide for execution of steps of a method according to embodiments of the present invention.

In a further embodiment, the present invention provides a tangible, non-transitory computer-readable medium having instructions thereon which, upon being executed by one or more processors, alone or in combination, facilitate secure data stream processing comprising steps of a method according to embodiments of the present invention.

FIG. 1 illustrates a system 10 for processing a data stream. An input stream of data elements, such as time-stamped measurements or events, is received from data producers 11 at a stream processor 12, which processes the input stream of data elements and outputs an output stream of data elements to one or more data consumers 13. The input and output streams can be sent to and from the stream processor 12 via a communications network. Various stream processing frameworks and engines, such as Apache Flink, exist for processing data streams. The technical application areas of such frameworks and engines are numerous, e.g., (1) system monitoring, (2) system verification and debugging, (3) intrusion, surveillance, and fraud detection, (4) data mining (e.g., advertising and electronic trading), and many others. As already mentioned above, the necessary computational resources (e.g., number of central processing units (CPUs) and memory) for processing the data streams online can be huge, in particular, when the analysis is stateful. A simple example for a stateful analysis is the counting of specific events over a sliding window. In this case, the state essentially consists of different time windows with counters that are updated when processing a data stream element.

To accommodate for the high demand on computational resources, data streams are usually processed in data centers. They offer a flexible allocation of computational resources based on the current data volume. However, the inventor has recognized that there are trust issues with current processing of data streams by data centers and advantageously provides for enhanced trust in the continuous output of a data stream. This results in less technical system errors and better performance of the technical systems as future decisions usually depend on the outcome of the analysis.

In particular, a data center is often operated by a different entity than the stream processing engine, data producers and data consumers, and may host several services that use and share the same computational resources, alone or together with other entities. Some entities might even be malicious with an interest in altering the analysis or the outcome of the analysis to their own benefits. Thus, it is a dangerous assumption to trust the data center operator and the other services. Moreover, even if a data stream is processed in its own data center, owned and operated by the same entity as the stream processing engine, some of the data center components might be compromised. In particular, for mission-critical applications that analyze sensitive data, it is especially advantageous to protect the stream processing engine and to minimize the trust assumptions on the environment in which the data is processed.

Embodiments of the present invention allow a service provider to process data streams with reduced trust assumptions by utilizing trusted execution environments. In particular, embodiments of the present invention provide to run critical parts of processing the stream elements in trusted execution environments, e.g., enclaves of Software Guard Extensions (SGX) from the company INTEL. As mentioned above, this requires to address the technical problem that computational resources, in particular, protected memory, are scarce in trusted execution environments and limit the applications of trusted execution environments. In other words, computations that are carried out within trusted execution environments must often be "resource-friendly" computations, e.g., they must not exceed a few hundred megabytes (MBs) of protected memory, including the binaries. Otherwise, there would be significant performance drops if protected memory is encrypted and swapped to unprotected memory.

In an embodiment, the present invention provides a method to reduce and control the use of protected memory of trusted execution environments. The method can be especially advantageous when used for stateful computations in data stream processing. Embodiments of the present invention are also applicable to areas other than stream processing applications for securing memory intensive computations by trusted execution environments.

A trusted execution environment offers an execution space that provides a high level of security and privacy for applications. Typically, a trusted execution environment provides security features such as integrity of applications and confidentiality of the application's assets. Many of today's trusted execution environments are realized by dedicated, protected parts of a CPU, including the computer's caches and main memory, which is isolated and encrypted. A prominent example of a trusted execution environment is provided by SGX and is referred to as an enclave. Victor Costan, et al., "Intel SGX Explained," Cryptology ePrint Archive, Report 2016/086 (2016), which is hereby incorporated by reference herein, describe SGX in great detail, with section 5 providing an overview of using SGX from a programmer's perspective, and also overview other trusted execution environments. Here, it is noted that the fast protected memory of the CPU's trusted execution environment is usually limited and applications often cannot dynamically allocate protected memory. The fast protected memory in SGX is referred to as the Enclave Page Cache (EPC), which is currently limited to at most 128 MB. Furthermore, for SGX, swapping must be supported by the underlying host operating system and encryption operations are required. Swapping, and in particular encryption, is usually expensive in terms of computational resources and cost and could significantly harm system performance. To the extent embodiments of the present invention refer to SGX below as a prominent example of a trusted execution environment, it is to be understood that such description is applicable also to other trusted execution environments which can be used in embodiments of the present invention.

Embodiments of the present invention described herein refer to a cryptographic hash function h, where h operates on variable-length strings s and produces values h(s) of short and fixed length. h(s) is often called the hash of s. Usually, the cryptographic hash function h is collision-resistant (i.e., it is computationally hard to find two different strings that map to the same value). A prominent example of a collision-resistant hash function is SHA256. State-of-the-art CPUs have dedicated instructions for computing hashes.

Figure 2:
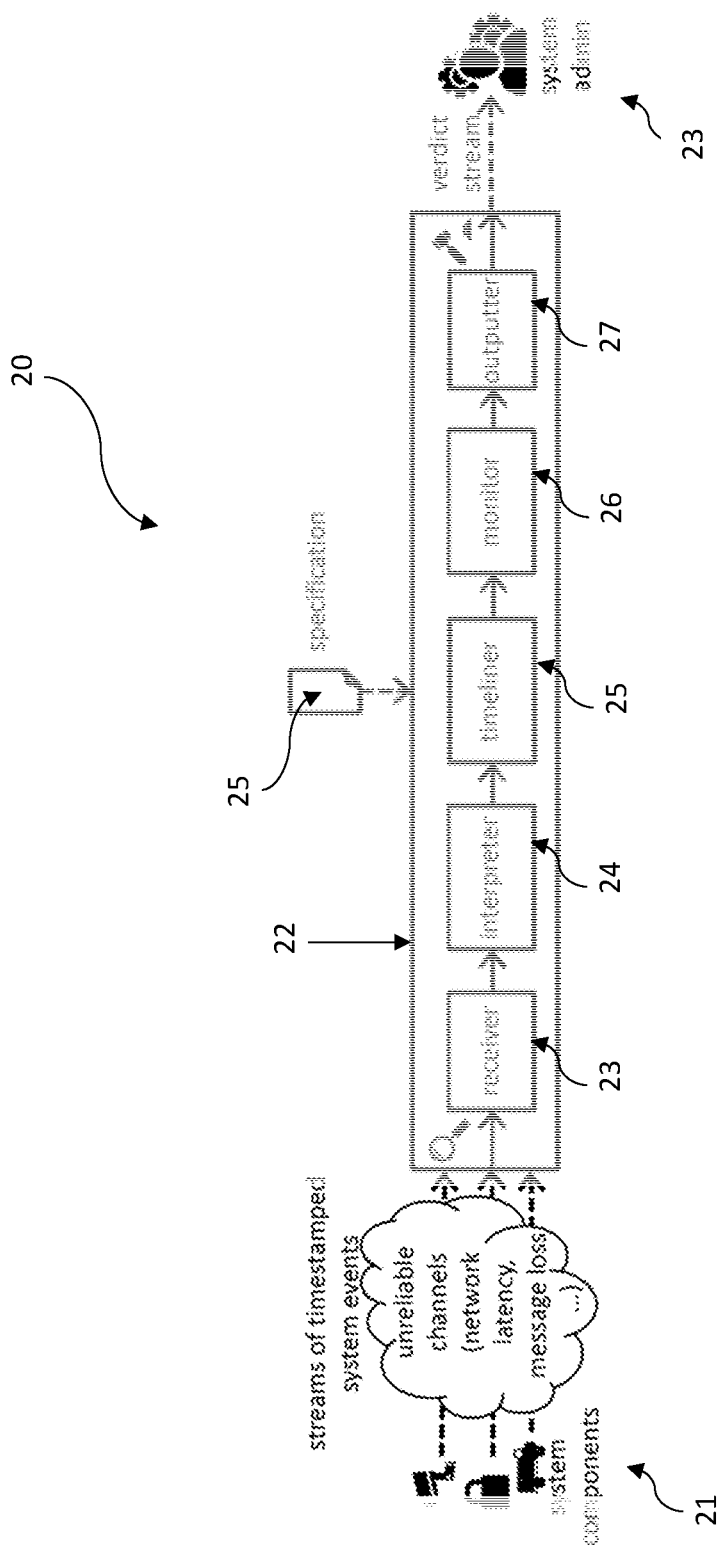
FIG. 2 schematically shows a pipeline for processing data streams including pipeline stages.

FIG. 2 illustrates a stream processing architecture 20 for processing data streams. The elements of a data stream are often processed in a pipeline 22 taking as input an input stream of data elements from system components 21, such as IoT devices, cameras, vehicles, security applications, etc., and outputting an output stream of data elements, which can also be referred to as a verdict stream, for use by a data producer or system administrator 23. The input stream of data elements can consist of time-stamped system events. Since the events are sent at different times, and can be sent by different communication means and using different communication networks, the channels are unreliable and issues such as network latency and message loss can result in incomplete and/or out-of-order input streams of data elements received at the pipeline 22. The pipeline 22, usually defined by a user-defined specification 25, may differ depending on the particular setting and application. In the example of FIG. 2, the pipeline 22 is designed for the application described in David Basin, et al., "Runtime Verification over Out-of-order Streams," ACM Transactions on Computational Logic, 21(1) (2020), which is hereby incorporated by reference herein, for monitoring system components and checking the components' behavior against a given temporal specification, where events can be received out of order. In this paper by David Basin, et al., section 4 provides the pseudo-code for the algorithms, section 5.2 describes the graph-based data structure (without any optimizations) and section 7 briefly describes the deployment and the operation of a monitoring component, but does not describe how to secure a monitoring component. U.S. Patent Application Publication No. 2019/0384689, which is hereby incorporated by reference herein, describes some optimizations of the algorithms described in this paper by David Basin, et al.

In the example of FIG. 2, the first stage of the pipeline 22 is a receiver stage 23 which parses the incoming stream elements. The second stage of the pipeline 22 is an interpreter stage 24 which extracts the events and their data values (e.g., via regular-expression matching). The third stage of the pipeline 22 is a timeliner stage 25 which determines an event's position in the stream based on the event's timestamp and in some cases additional information. The fourth stage of the pipeline 22 is a monitor stage 26 which processes the events and computes the verdicts. Finally, the fifth stage of the pipeline 22 is an outputter stage 27 which reports the verdicts.

In general, different stages of the pipeline 22 can be more or less computational resource intensive. For example, the computations of the receiver stage 23, the interpreter stage 24, and the outputter stage 27 are stateless and they can more easily be realized with moderate computational resources. However, the monitor stage 26 involves a stateful computation and is much more computational resource intensive. Furthermore, the computations of the monitor stage 26 are the most critical and sensitive computations in the pipeline 22. The timeliner stage 25 is also stateful as it keeps track of the gaps between time points. This information is updated whenever receiving a message. For doing these update quickly, it is preferable to use balanced search trees.

The pipeline 22 can be realized in various different ways. For example, the stages 23-27 of the pipeline 22 can all be executed on a single computer. For performance reasons, the stages 23-27 can run concurrently in separate threads whereby processing stream elements can run in parallel. Each thread can run in a separate trusted execution environment. Since the protected memory of different SGX enclaves cannot be shared, when enclaves want to exchange data, the thread of enclave A with the data must write the data first to unprotected memory (possibly encrypted for ensuring the data's confidentiality and integrity). The data is then read the thread of enclave B by accessing unprotected memory. It is also possible that the threads run in the same trusted execution environment. In this case, the threads have access the same protected memory, in SGX for example. The stages 23-27 can also run on different computers (physically separated, or virtualized on a single host or multiple hosts) and use sockets for their communication. In fact, each of the stages 23-27 may comprise multiple subcomponents, which are distributed over several computers.

To secure the processing of the stream elements, embodiments of the present invention provide to run the stages' critical parts in trusted execution environments. When using SGX, the critical parts run in the so-called enclaves with a layer around them that, e.g., handle the communication. By using standard cryptographic means, it is possible to establish secure channels between the stages 23-27 and to secure the stages' communication. Prior to processing the data stream elements, an initialization step can be used to set-up the stages 23-27 by loading the code of one or more of the stages 23-27 into trusted execution environments and establishing secure communication channels between them. For example, a shared secret can be used to encrypt the communication channels between the stages 23-27. The initialization step also may also include a remote attestation of the software running inside the trusted execution environments. In addition, for the critical parts running inside a trusted execution environment, the initialization step also reserves protected memory which is provided by the trusted execution environment.

For the current version of SGX, protected memory is reserved at the start time of an enclave. Memory management, however, may vary between TEEs and even their versions. For example, for SGX, sections 5.2 and 5.3 of the above-referenced paper by Victor Costan, et al. describe the creation and the initialization of an enclave, and the memory management, using particular CPU instructions for setting up the enclave. In SGX, each enclave has its own (virtual) protected memory (ELRANGE), which must be fixed when creating the enclave (ECREATE instruction). The code that runs inside the enclave must be copied from unprotected memory to protected memory via the EADD instruction. This code can then allocate protected memory (within the reserved memory ELRANGE) when it runs. This code should be checked after it is copied into the protected memory and before it runs (remote attestation, see sections 3.3 and 5.8 of the above-referenced paper by Victor Costan, et al.). Further, SGX has the physical protected memory called enclave page cache (EPC), which is referred to herein also as "the fast protected memory," which is reserved at boot time with a limit of 128 MB. Pages can be swapped in and out of the EPC. The swapping must be supported by the operating system as discussed in section 5.5 of the above-referenced paper by Victor Costan, et al. The EPC is shared between all enclaves. The CPU makes sure that an enclave only accesses EPC parts which contain data from the enclave. Setting up the trusted execution environment may also include the configuration of the code that runs in the trusted execution environment, such as choosing a strategy for swapping segments between protected and unprotected memory. The strategy can also be fixed within the code.

Additional information about attestation for SGX enclaves as an example of a trusted execution environment can be found in Scarlata, Vinnie et al., "Supporting Third Party Attestation for INTEL SGX with INTEL Data Center Attestation Primitives," INTEL CORPORATION (2018), which is hereby incorporated by reference herein. Remote attestation is standard and may differ between different trusted execution environments. A key feature of remote attestation is the measurement of the initially loaded code and data to the trusted execution environment. This measurement usually comprises a hash of the loaded binary and data, which is checked against a previously registered hash. Typically, there are multiple components involved in the attestation (e.g., the enclave, the application of the enclave, a verifier, and an attestation service).

To protect against rollback attacks, an embodiment of the present invention provides to use sequential monotonic counters, which are often provided by the trusted execution environments, to bind messages to a unique counter value. Alternatively, enclaves can draw and advertise a random ID at each reboot. Also, when running two pipeline stages in the same trusted execution environment, an embodiment of the present invention provides to use the protected memory for communication, thereby reducing the overhead of encrypting and decrypting messages, and loading data from unprotected memory into protected memory, and vice versa.

The monitor stage 26 in the pipeline 22 shown in FIG. 2 is responsible for state maintenance and maintains a state which is updated for each received event. When the state is small, the critical parts of the entire monitor stage 26 can run in a trusted execution environment and only access fast protected memory when updating the state of the monitor stage 26. However, there are no guarantees that the state remains small during runtime or that all parts of the state will fit into protected memory.

Embodiments of the present invention provide to safely and temporarily store parts of the state of a stage of the pipeline 22, such as the monitor stage 26, in unprotected memory when not enough protected memory is available. A data structure represents the state of the monitor stage 26. Additional details on the data structure and how it can be updated are described in the paper by David Basin, et al. which is incorporated herein by reference above.

Figure 3:
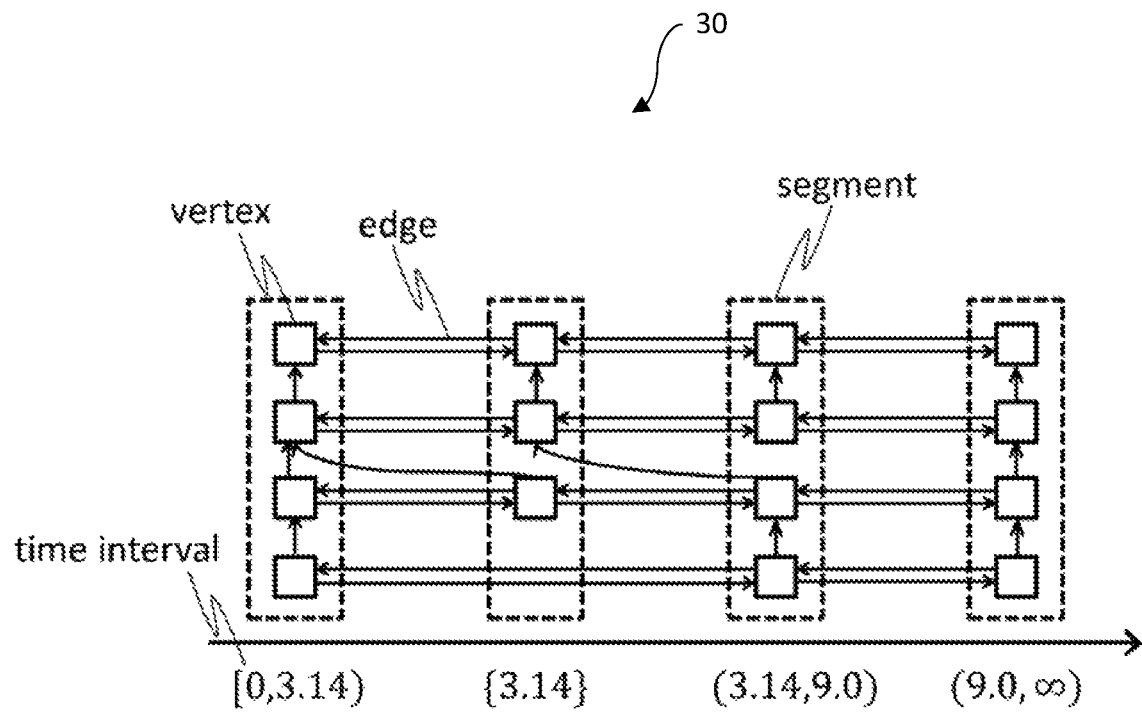
FIG. 3 schematically shows a graph-based data structure for processing data streams in accordance with an embodiment of the present invention.

As schematically illustrated in FIG. 3, a data structure 30 representing the state of a pipeline stage is essentially a graph in which each vertex has incoming and outgoing edges. Each vertex is assigned to a time interval. In the following, the vertices for a given time interval are also referred to as a segment. The segments and their vertices can be ordered by the segments' time intervals. The time intervals are disjoint. In addition to the edges of a vertex, a vertex may store additional values like a data value. In the example of FIG. 3, the vertices of the graph are also grouped horizontally into layers. There are two types of edges: horizontal edges (i.e., edges between neighboring vertices of the same layer) and vertical edges (i.e., edges between vertices of different layers).

The update operations performed on the graph of the data structure 30 involve: (1) the adding of new segments, (2) the removal of segments, and (3) the removal of individual vertices in a segment. Adding and removing segments includes the adding and the removal of vertices in the respective segment and the update of the vertices' edges and their neighboring vertices, which in turn can trigger an update of their neighboring vertices. Analogously, the removal of individual vertices includes the update of neighboring vertices and their edges.

It is advantageously provided in embodiments of the present invention that (1) vertices are grouped into segments, and (2) update operations on the graph are typically local, e.g., vertices of only a few neighboring segments are involved in updating the graph. Embodiments of the present invention can be applied to many types of data structures which have an underlying graph-based structure. Furthermore, the vertices of such data structures can also be grouped together and the operations on these data structures also only typically alter the graph-based structure locally. For example, balanced search trees, such as B-trees and variants thereof, are essentially graph-based data structures. The tree nodes can be grouped into subtrees and the operations of adding and removing elements stored in the tree typically involve only the update of a small portion of the tree. In the worst case, O(log n) nodes are accessed, where n is the number of elements stored in the tree.

According to embodiments of the present invention, the trusted execution environment in which one or more pipeline stages are run temporarily stores segments in unprotected memory, when the graph becomes too big to be stored completely and updated in protected memory. Temporarily storing segments in unprotected memory allows to make room in protected memory for new segments. Embodiments of the present invention use the operations Store and Load to move segments between protected and unprotected memory as follows:

(1) Store(S) stores the segment S, which is currently in protected memory, into unprotected memory.
(2) Load(S) loads the segment S from unprotected memory into protected memory.

The Store and Load operations therefore allow one to "swap" state parts between different kinds of memory.

Exemplary pseudocode is provided below for the Store and Load operations. This pseudocode illustrates the steps involved in the operations. It is noted, however, that the pseudocode is not thread-safe and omits details in order to enhance understanding. Thread-safety is straightforward by adding locks. Further, it is noted that some of the operations may panic (i.e., raise an exception). For instance, findProtectedMemory and findUnprotectedMemory operations may fail to find free space for a segment. In this case, they would panic. The panics/exceptions can be caught on the caller site.

```
# LOAD returns the memory address of the segment for a given key.
# The address is in protected memory. If the segment is currently
# temporarily stored in unprotected memory, the segment is copied into
# protected memory. Furthermore, the segment's integrity is checked.
LOAD(key):
   # Get the value of the key from the key-value store. The value
   # includes the memory address of the segment. The value also
   # includes the hash of the segment.
   value = lookup(key)
   if protected(value):
       # The segment is already stored in protected memory. Return
       # the segment's memory location.
       return location(value)
   if unprotected(value):
       # Find a location in protected memory. Note that if there
       # is not enough space in protected memory,
       # findProtectedLocation will make room in protected memory
       # by moving other segments from protected memory to
       # unprotected memory according to some strategy.
       addr = findProtectedLocation(value)
       # Copy the segment from unprotected memory to protected
       # memory. Release also the unprotected memory.
       copy(addr, value)
       # Check the integrity of the segment.
       if hash(addr) != value.hash:
          panic(invalid hash)
       # Update the key-value store, i.e., the value's address of
       # the segment with the given key.
       updateAddr(value, addr)
       # Mark the protected memory as occupied.
       mark(value)
       return location(value)
   panic(invalid address)
# STORE moves the segment with the given key to unprotected memory.
STORE(key):
   value = lookup(key)
   if unprotected(value):
       # Nothing to do, since the segment is already temporarily
       # stored in unprotected memory.
       return
   if protected(value):
       # Find a location in unprotected memory. Note that we
       # can assume that there is enough space in unprotected
       # memory to temporarily store the segment in unprotected
       # memory.
       addr = findUnprotectedLocation(value)
       # Unmark the protected memory for the segment.
       unmark(value)
       # Update the hash for the segment in the key-value store.
       updateHash(value, hash(value))
       # Update the address for the segment in the key-value
       # store.
       updateAddr(value, addr)
       # Copy the segment from protected memory to unprotected
       # memory.
       copy(addr, value)
       return
   panic(invalid address)
```

Swapping between different memory layers, which differ in size and speed, is ubiquitous in computing. However, these memory layers do not differ in their security guarantees. In contrast, the Store and Load operations swap state parts between memory kinds with different security guarantees. In this respect, the swapping by the Store and Load operations provides independence of the security measures from the performance differences of other store/load cache operations. Furthermore, their realization is not straightforward since they must meet certain security goals in addition to their functional requirements.

For both the Load and Store operations, embodiments of the present invention provide for enhanced security and does not just copy segments. This addresses the security risk that an attacker can access the unprotected memory and change the segment to thereby alter the outcome of the computation. It is also advantageously provided in embodiments of the present invention that the trusted execution environment also keeps track of the memory location where a particular segment is stored.

Figure 4:
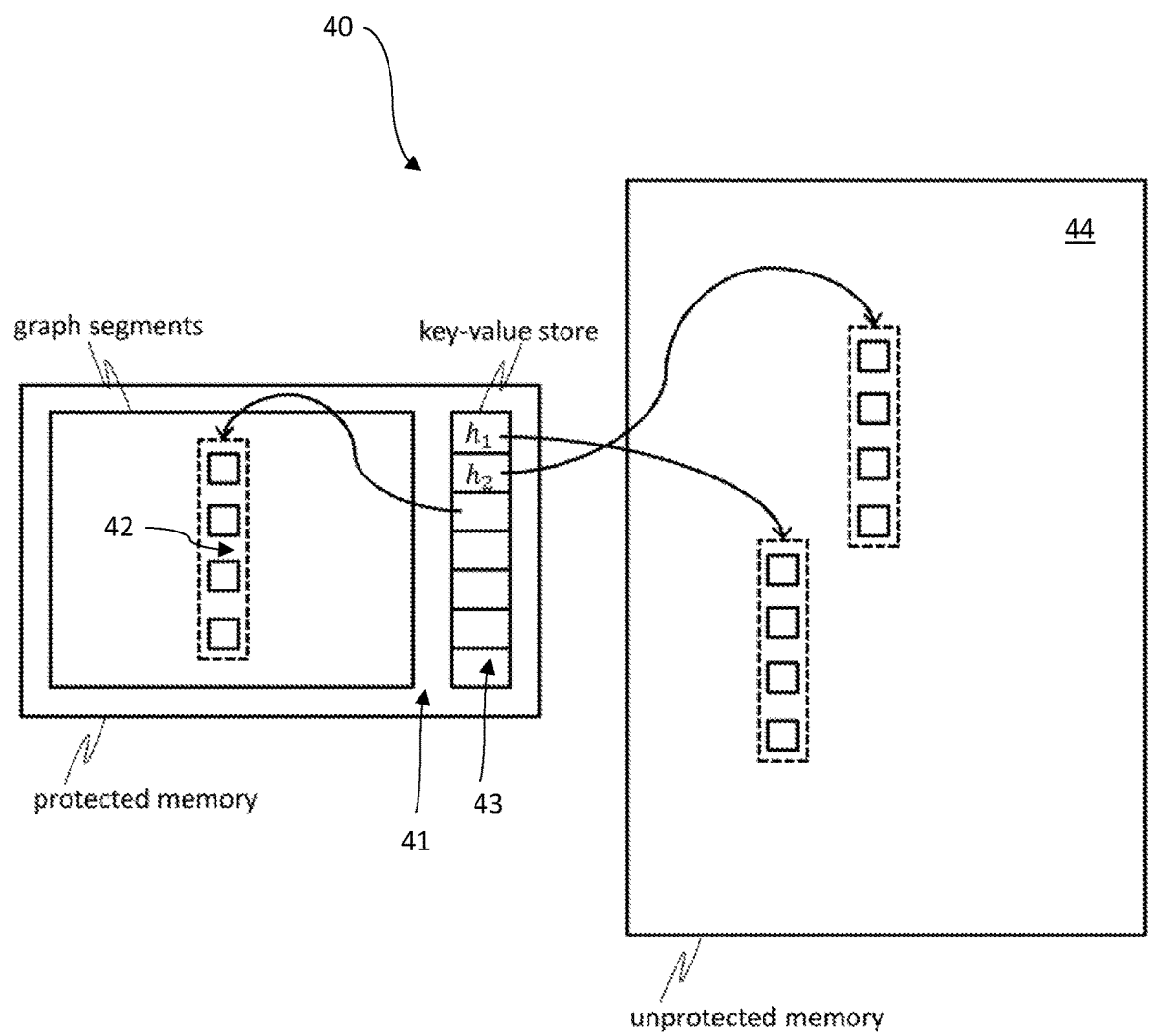
FIG. 4 shows a system and method for storing and loading graph segments in accordance with an embodiment of the present invention.

According to an embodiment of the present invention, a method and system 40 for swapping state parts, which are represented in a structure of graph segments 42 of the graph-based data structure described above, between protected memory 41 of a trusted execution environment and unprotected memory 44 is shown in FIG. 4. The trusted execution environment maintains a key-value store 43 in its protected memory 41 that stores hashes $h_1, h_2, \ldots$ of the segments 42 and the locations of the segments. The hashes $h_1, h_2, \ldots$ are used to check the integrity of segments 42 and the locations are used to find segments quickly. The use of the hashes $h_1, h_2, \ldots$ in the key-value store 43 of the protected memory 41 allow to achieve enhanced security by allowing to check the computation's integrity. In an embodiment of the present invention, the keys are the segments' intervals. In an embodiment of the present invention, the left bounds of the intervals can be used keys since the segments' intervals are disjoint. As noted above, a technical problem solved by embodiments of the present invention is that the protected memory of a trusted execution environment is limited. In particular, there is an upper bound on the number of segments that fit into protected memory. An initialization step can allocate an array for storing the segments in protected memory. In particular, for a given number of maximal segments that are stored in protected memory (MAX) and under the assumption that each segment has a fixed number of bytes (LEN), an array of MAX*LEN bytes can be allocated according to the following pseudocode:

allocate(MAX*LEN, sizeof(byte))

The Load operation then copies segments to the locations 0, MAX, 2*MAX, . . . in the array.

In an embodiment of the present invention, the key-value store 43 can be realized by a hash map. Alternatively, it possible to use a balanced search tree where the keys are ordered.

The keys provide unique identifiers of the segments 42, which is an interval according to an embodiment of the present invention. The memory location of the segments in memory is provided by the key-value store 43. For obtaining the memory location of a respective one of the segments 42, a lookup is done in the key-value store 43 with the segment's key. The value found in the lookup contains the segment's memory address.

Embodiments of the present invention can be particularly advantageously applied to address an attacker model that targets the outcome of a computation. The use of hashes $h_1$, $h_2$, . . . for the segments 42 enhance security against such an attacker model by guaranteeing the computation's integrity. Other security measures can also be used when considering an attacker model that additionally targets the confidentiality of a computation. For example, it is possible to also ensure the computation's confidentially when encrypting the state parts prior to storing them in the unprotected memory 44. SGX relies in general on encryption and the underlying operating system when exceeding the available fast protected memory. However, the overhead for such encryption may significantly harm performance when swapping protected memory blocks into the unprotected memory 44. Although ensuring the computation's integrity produces also some computational overhead, this is mostly the computation of hashes for which the runtime penalty is relatively much lower since hashes can be computed rather quickly and state-of-the-art CPUs provide direct support for such operations with dedicated instructions.

In embodiments of the present invention, different strategies can be applied to dictate which segments 43 should be temporarily stored in the unprotected memory 44. For example, a simple strategy randomly picks the segments 42 that should be temporarily stored in the unprotected memory 44. Alternatively, a round-robin strategy or a strategy that prioritizes the least frequently used segments 42 to be temporarily stored in the unprotected memory could also be used. In some embodiments of the present invention, it is possible to group adjacent segments 42 together and swap bigger chunks of the graph-based data structure to the unprotected memory 44 instead of temporarily storing individual segments 42 in the unprotected memory 44. Using a strategy to swap bigger chunks can advantageously reduce the required instances of access to the unprotected memory 44. For computing hashes, and loading and storing segments 42 between the protected memory 41 and the unprotected memory 44, with minimal computational cost overhead, embodiments of the present invention use pointers.

The memory locations in protected memory 41 can either be used by swapping in segments 42 from unprotected memory 44 or, when a segment 42 is split in multiple segments, the new resulting segments can be stored in these memory locations. According to embodiments of the present invention, the trusted execution environment does not perform any computation on the segments 42 that are temporarily stored in unprotected memory 44 for security reasons. Rather, all computations on the segments 42 are performed inside the trusted execution environment to prevent an attacker from changing an outcome of the computations. Embodiments of the present invention also address the security risk that the segments 42 that are temporarily stored in unprotected memory 44 can be read by any other application (attacker). In particular, embodiments of the present invention provide to compute and store hashes of these segments 42 inside the trusted execution environment, and the trusted execution environment will use those hashes to detect any change to the segments 42 when they are loaded back into protected memory 41.

Figure 5:
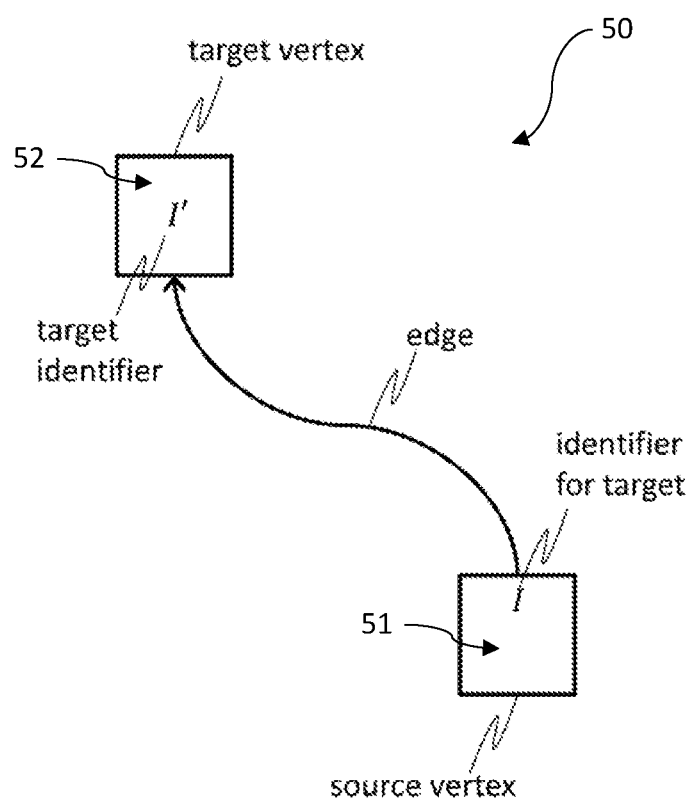
FIG. 5 schematically shows the accessing of objects by extended pointers in accordance with an embodiment of the present invention.

FIG. 5 of the present invention shows an example method 50 of using edges of the graph-based data structure as pointers from a source vertex 51 to a target vertex 52. In particular, an edge of a source vertex 51 in the graph-based data structure is a pointer that points to the memory cell in which the target vertex 52 is stored.

However, if the memory location of a segment is changed, edges with target vertices in this segment become invalid. It is not guaranteed that when loading a segment back into protected memory that it is placed at the same memory location in protected memory. For example, a pointer can point to an object located at the memory address 1, which is an address in protected memory. Now, the object is swapped into unprotected memory, e.g., to address 1000. Further, another object from unprotected memory is swapped in protected memory to address 1. In this case, the pointer now points to the wrong object. It would be possible to update the pointer so that it points to the memory address 1000 instead of the memory address 1, However, it is advantageously provided and preferred according to embodiments of the present invention to provide objects with unique identifiers and to provide pointers which store the identifiers to which they point to. This has the advantage of avoiding updating all pointers that point to an object whenever the object is loaded it in protected memory or whenever the object is stored in unprotected memory. Otherwise, the wrong object might be accessed by the pointer. Changing the pointers to an object is difficult, since the object does not know what points to it. Accordingly, providing objects with unique identifiers and providing pointers which store the identifiers to which they point to advantageously saves computation time, resources and complexity while only having a minimal overhead of storing identifiers and comparing identifiers, when accessing an object via a pointer. This overhead is particularly small, for example, where the identifiers are integers or the segments' intervals.

Thus, the problem of changing memory locations can be overcome in accordance with embodiments of the present invention. In particular, embodiments of the present invention extend pointers with an additional component which is static. More specifically, according to an embodiment of the present invention, a pointer is extended with an identifier I for the object to which the pointer points to. In the example, of FIG. 5, the object is the target vertex 52. However, in other contexts, the object can be, for example, an array, a table, a tree, another graph, etc. A vertex, as any other object, is a structure in memory and a pointer to a vertex/object is the memory address at which the vertex/object is stored. For example, at this memory address, the data for the target vertex 52 can be found, including its outgoing edges, which are in turn pointers to other target vertexes. The object also stores its identifier I' as part of the data values stored at the memory location of the target vertex 52. A pointer always points to protected memory. If it is desired to access the object, first the pointer is followed and the identifier values I, I' are compared at the source vertex 51 and the target vertex 52. If the values are equal, the object can be accessed, e.g., reading the values' of its components. Otherwise, if they are not equal, the key-value store is used to find the target object and update the pointer. Either (1) the object is temporarily stored in unprotected memory, or (2) it is stored in protected memory at another location. In the first case, the object is loaded back into protected memory (this includes the checking of the object's integrity and updating the key-value store) and the pointer at the source to the object is updated. In the second case, the pointer to the object is updated at the source.

In an embodiment of the present invention, a simple counter can provide identifiers I, I' for the objects. The counter is increased whenever a new object is created. According to embodiments of the present invention, the objects are vertices and it is also possible to use the time interval of the segment of the vertex for the identifiers I, I'. It is also possible to use the left bound of the intervals as identifiers I, I' since the time intervals are disjoint. The reason why the interval and the intervals left bound are usable for identifiers is that the vertices in the segments belong to layers and the target vertex of an edge is determined by the layer of the source vertex 51 and the segment of the target vertex 52.

Advantageously, such use of the edges of the graph-based data structure as pointers provides for minimal computational cost overhead when using unprotected memory. First, the additional required memory for storing the identifiers is negligible. Second, the step of checking whether identifiers are equal is simple and fast. Third, a pointer update at a source vertex is only performed when accessing the target vertex 52 that has been temporarily stored previously in unprotected memory.

As an example, a pointer to memory location Y additionally stores the identifier of the object at memory location Y. Furthermore, the object stores its identifier. When following the pointer, the pointer's identifier is compared with the object's identifier. If the identifiers are not equal, the new location of the object is found by a lookup in the key-value store (hash table). If the object is in unprotected memory, it is loaded into protected memory and the memory address to which the pointer points is updated accordingly. If the object is in protected memory (but at a different location because it was previously swapped out and swapped back in later), it is only needed to update the memory address to which the pointer points to accordingly.

As mentioned above, to ensure the integrity of a segment when it is loaded back to the protected memory, the trusted execution environment keeps a hash of the segment in the key-value store. If the hashes do not match, the trusted execution environment can conclude that someone tampered with the segment and abort the operation and/or provide an alert. The trusted execution environment can also encrypt the segment before writing it to unprotected memory. This would not only guarantee the segment's integrity, but also its confidentiality. However, computing and comparing hashes is significantly faster than encryption and later decryption the segment. Accordingly, whether encryption is additionally performed can depend on the particular application. For example, in some instances the information leakage to an attacker by a portion of the segments is limited where the graph is continuously updated and the segments only provide a partial snapshot of the current graph.

In the following, the hashing of segments and production of the key-value store according to embodiments of the present invention is further discussed. In particular, the hash of a segment S for the time interval I and with the vertices $v_1, \ldots, v_n$ is defined as:

$$\text{hash}(S) \stackrel{\text{def}}{=} h(\text{serialize}(I) \| \text{serialize}(v_1) \| \ldots \| \text{serialize}(v_n))$$

where $\|$ denotes string concatenation and serialize is a function that returns a string representation of the given object.

For example, the function serialize could marshal the argument into the argument's JSON encoding. In particular, for a vertex v with the outgoing edges $e_1, \ldots, e_m$, the function is defined as:

$$\text{serialize}(v) \stackrel{\text{def}}{=} \text{``layer:''} \| \ell \| \text{``outgoing:''} \| [\text{serialize}(I_1), \ldots \text{serialize}(I_m)]$$

where the notation [ . . . ] denotes lists, $\ell \in \mathbb{N}$ is the layer of the vertex v, and $I_i$ is the segment interval of the target vertex of the edge $e_i$, for $i \in \{1, \ldots, m\}$. If a vertex v comprises additional fields (e.g., a data value), those fields would be included in the vertex's serialization and thus in the segment's hash.

Advantageously, according to embodiments of the present invention, the identifiers of vertices and target vertices of edges are protected. If an attacker changes them while the segment is stored in unprotected memory, this change would be detected through the use of the cryptographic, collision-resistant hash function h since a change of the identifiers would result in a different hash with very high probability.

With regard to the Store and Load operations, the Store operation computes the hash of the segment in accordance with the above description, copies the segment to unprotected memory and updates the key-value store with the hash and location. The Load operation first copies the segment from unprotected memory into protected memory. If there is not enough space in protected memory, another segment is temporarily stored in unprotected memory using the Store operation. Afterwards, the Load operation computes the hash of the loaded segment in accordance with the above description and checks it against the corresponding hash in the key-value store. Finally, the Load operation updates the key-value store with the location in the protected memory. The Load operation determines the location of the segment in unprotected memory with a lookup in the key-value store. The key-value store stores the current memory location of the segments, which is either an memory address in protected memory or unprotected memory. The key (e.g., interval) is always the same for a segment. The value contains the current memory location. However, as noted above, the memory location can change when swapping in a segment from protected memory to unprotected memory, and vice versa. To ensure data integrity, the value also contains the hash of the segment.

Embodiments of the present invention provide for the following advantages/improvements:

1) Enabling different pipeline stages of a pipelining architecture to run in its own trusted execution environment and thereby be protected individually and separately. This is particularly advantageous for stateful pipelining stages which require more memory.

2) Ensuring the integrity of stateful computations in data stream processing by processing the data in trusted execution environment while overcoming limitations on the memory usage of such computations. Alternative solutions either trust the stream processor or encapsulate the whole stream processing engine into a trusted execution environment. The first alternative solution does not provide any security guarantees for the data stream processing engine, which is unacceptable in environments with malicious agents and where the output must be trustworthy. The second alternative solution has the disadvantage that a larger code base runs inside a trusted execution environment which does not protect against vulnerabilities that originate from software bugs or misconfigured components. Thus, Furthermore, memory is a potential bottleneck in trusted execution environments. For example, in SGX, there can be a substantial computational performance drop when memory usage of enclaves is high as the "trusted" memory is limited and reserved at boot time.

3) Securely swapping state parts from a computation between protected and unprotected memory by maintaining a key-value store.
   a. Protection of the parts' integrity when temporarily stored in unprotected memory.
   b. Minimal overhead for accessing objects through pointers. An object has an identifier. For a pointer, the target's identifier is stored at the source. When accessing the object, it is checked whether the identifiers match. If they do not match, the correct object is found by a lookup in the key-value store.

Providing the pointers with the additional identifiers in accordance with embodiments of the present invention help to access objects correctly. For example, where it is desired to visit a target vertex, this can be done by following an edge from the edge's source vertex to its target vertex. The edge is represented by a pointer. The source vertex contains the pointer and the target vertex is at the memory address to which the pointer points. However, the memory address may change because of swapping segments between protected and unprotected memory. In accordance with embodiments of the present invention, the memory address to which the pointer points is taken and the identifier that is additionally added to the pointer is compared with the identifier that is found at the respective memory address. If the identifiers are equal, the target vertex is the correct one. In other words, the memory address to which the pointer points to is up-to-date. If the identifiers are not equal, the memory address to which the pointer points to is not correct and the memory address is updated. To do so, first a lookup is performed in the key-value store with the key of the pointer's identifier. The value contains the current memory address, which is either an address in protected or unprotected memory. If the address is in protected memory, just the pointer is updated. If the address is in unprotected memory, the segment/vertex is loaded into protected memory using the Load operation, which updates the value in the key-value store. The pointer is also updated after loading the target vertex into protected memory.

It is possible to use the same identifiers of the segments, which are the keys of the key-value store, for vertexes. A segment can be an array of vertices and grouped into layers, wherein the "target" layer is known from the "source" layer of the vertices. If this would not be the case, it would be possible to add the array index to the identifier such that the identifier of a vertex is a pair consisting of the segment identifier and the array index.

In an embodiment, the present invention provides a method for processing data streams in a pipeline in an untrusted environment, wherein critical parts of a stage's computations are secured by trusted execution environments. The pipeline stages can be executed on a single processor, where each stage runs in a different thread, or the stages run on separate computers. The method comprises:

1) Initialization of the pipeline. This includes setting up the trusted execution environments for the critical pipeline stages, reserving their protected memory, and checking the integrity of the stages' software (remote attestation).
2) A pipeline stage with limited memory resources maintains a key-value store for quickly finding state parts and for storing their hashes, which are used for checking the state parts' integrity. When a state part is moved to unprotected memory, its hash is saved and its location is updated in the key-value store. When a state part is moved to protected memory, its integrity is checked and its location is updated in the key-value store.
3) Preferably, when accessing objects via pointers, (a) the objects are extended with identifiers, and (b) each pointer additionally carries the object's identifiers to which the pointer points to. When accessing an object, it is checked whether the pointer's identifiers equals the object's identifier. If the identifiers are equal, the correct object is accessed. If the identifiers are not equal, the key-value store is used to lookup the new memory location of the object (by using the identifier that the pointer carries), and the memory location to which the pointer points to is updated. The lookup might trigger the loading of the object from unprotected memory into protected memory.

Embodiments of the present invention can advantageously be implemented in IoT platforms (e.g., securing data processing in FIWARE), or for enhancing security operations centers (SOCs), which also analyze data streams. The data-stream analysis could be performed in a partially untrusted environment (e.g., with SGX multi-core CPUs).

Processing a data stream completely in a trusted execution environment, rather than using unprotected memory for some parts of the computation in accordance with embodiments of the present invention, usually results in an increased attack surface (stemming from software bugs and misconfigured components) and possibly decreased performance. Also, trusted execution environments have severe limitations on the available fast protected memory. Trusting the stream processing engine, rather than using unprotected memory for some parts of the computation in accordance with embodiments of the present invention can have severe consequences. When lowered trust assumptions are not met, an attacker can tamper the output of the stream processing engine. This can have catastrophic consequences when critical decision depend of the output.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for securing data stream processing, the method comprising:
    implementing a stage of a data processing pipeline in a trusted execution environment, wherein a state of the stage is represented by a graph-based data structure;
    reserving protected memory of the trusted execution environment for computations of the stage;
    maintaining a key-value store in the protected memory, the key-value store including hashes of graph segments of the graph-based data structure for the computations and memory locations of the graph segments;
    moving a state part of the computations from the protected memory to unprotected memory; and
    loading the state part of the computations back to the protected memory, wherein an integrity of a computation using the state part of the computations is checked using the hashes in the key-value store.

2. The method according to claim 1, wherein the graph-based data structure includes vertices with incoming and outgoing edges assigned to time intervals, wherein each of the graph segments include the vertices which are at a same time interval, and wherein the edges are used as pointers for accessing objects.

3. The method according to claim 2, wherein each of the objects includes an identifier, wherein each of the pointers from a source vertex to a target vertex carries an identifier for one of the objects, and wherein it is checked whether the identifiers are equal for accessing the objects.

4. The method according to claim 3, wherein, in a case that the identifiers are the same, a correct one of the objects is accessed, and, in a case that the identifiers are not the same, the correct one of the objects is determined using the identifier carried by the pointer and the key-value store.

5. The method according to claim 4, wherein, in a case that the correct one of the objects is stored in the unprotected memory, the object is loaded back into the protected memory using the hashes of the key-value store to ensure computation integrity and the location of the object is updated in the key-value store.

6. The method according to claim 3, wherein the time intervals are disjoint, and wherein the identifiers of the objects are based on respective time intervals of the graph segments which contain the objects.

7. The method according to claim 3, wherein a counter is used for the identifiers of the objects with the counter being increased each time a new object is added.

8. The method according to claim 1, wherein it is determined that the state part of the computations has been tampered with based on a hash of the state part loaded back into the protected memory not matching a hash of the state part stored in the key-value store.

9. The method according to claim 1, wherein the hashes of the graph segments are determined using a cryptographic and collision-resistant hash function.

10. The method according to claim 1, wherein the data processing pipeline processes an out-of-order stream of time-stamped system events, and wherein the stage is a monitor stage which processes the events and computes verdicts.

11. The method according to claim 1, wherein the key-value store is in a form of a hash map or a balanced search tree.

12. The method according to claim 1, wherein at least two stages of the data processing pipeline are implemented in the trusted execution environment, and wherein communication between the at least two stages is performed using the protected memory.

13. The method according to claim 1, wherein the stage of the data processing pipeline runs concurrently with other stages of the data processing pipeline in separate threads or on separate machines.

14. A system for securing data stream processing comprising one or more processors which, alone or in combination, are configured to provide for execution of the following steps:
    implementing a stage of a data processing pipeline in a trusted execution environment, wherein a state of the stage is represented by a graph-based data structure;
    reserving protected memory of the trusted execution environment for computations of the stage;
    maintaining a key-value store in the protected memory, the key-value store including hashes of graph segments of the graph-based data structure for the computations and memory locations of the graph segments;
    moving a state part of the computations from the protected memory to unprotected memory; and
    loading the state part of the computations back to the protected memory, wherein an integrity of a computation using the state part of the computations is checked using the hashes in the key-value store.

15. A tangible, non-transitory computer-readable medium having instructions thereon which, upon being executed by one or more processors, alone or in combination, facilitate secure data stream processing comprising the following steps:
    implementing a stage of a data processing pipeline in a trusted execution environment, wherein a state of the stage is represented by a graph-based data structure;
    reserving protected memory of the trusted execution environment for computations of the stage;
    maintaining a key-value store in the protected memory, the key-value store including hashes of graph segments of the graph-based data structure for the computations and memory locations of the graph segments;
    moving a state part of the computations from the protected memory to unprotected memory; and
    loading the state part of the computations back to the protected memory, wherein an integrity of a computation using the state part of the computations is checked using the hashes in the key-value store.

* * * * *